United States Patent [19]

Lienau

[11] 4,287,445
[45] Sep. 1, 1981

[54] HIGH PERFORMANCE DISK DRIVE ACTUATOR

[75] Inventor: Mark H. Lienau, San Jose, Calif.

[73] Assignee: Sperry Corporation, New York, N.Y.

[21] Appl. No.: 142,579

[22] Filed: Apr. 21, 1980

[51] Int. Cl.³ ............................................ H02K 41/02
[52] U.S. Cl. ..................................................... 310/13
[58] Field of Search ..................................... 360/12-14; 318/135

[56] References Cited

U.S. PATENT DOCUMENTS

| | | | |
|---|---|---|---|
| 3,666,977 | 5/1972 | Helms et al. | 310/13 |
| 3,735,163 | 5/1973 | Dijkstra et al. | 340/13 |
| 3,746,937 | 7/1973 | Koike | 310/13 X |
| 3,852,626 | 12/1974 | Davis | 310/13 |
| 4,006,372 | 2/1977 | Brown, Jr. et al. | 310/13 |

*Primary Examiner*—Donovan F. Duggan

*Attorney, Agent, or Firm*—Eugene T. Battjer; William E. Cleaver; Marshall M. Truex

[57] ABSTRACT

An electromagnetic linear actuator for positioning a transducer over locations on a rotating magnetic recording disk comprising an actuator housing used as a stationary base for supporting various parts; a coil and cart assembly including a cart, having a rectangular cross section and tubular in construction, adapted at one end to support the transducer, and including a direct current coil with a cross section matching that of the cart mounted at the other end thereof; magnetic means affixed to the actuator housing having an air gap for receiving the coil so that the coil is immersed in a magnetic field; and support means affixed to the actuator housing engaging the surfaces of the cart and disposed about the center of gravity of a moving-mass assembly consisting of the coil and cart assembly and the transducer.

6 Claims, 6 Drawing Figures

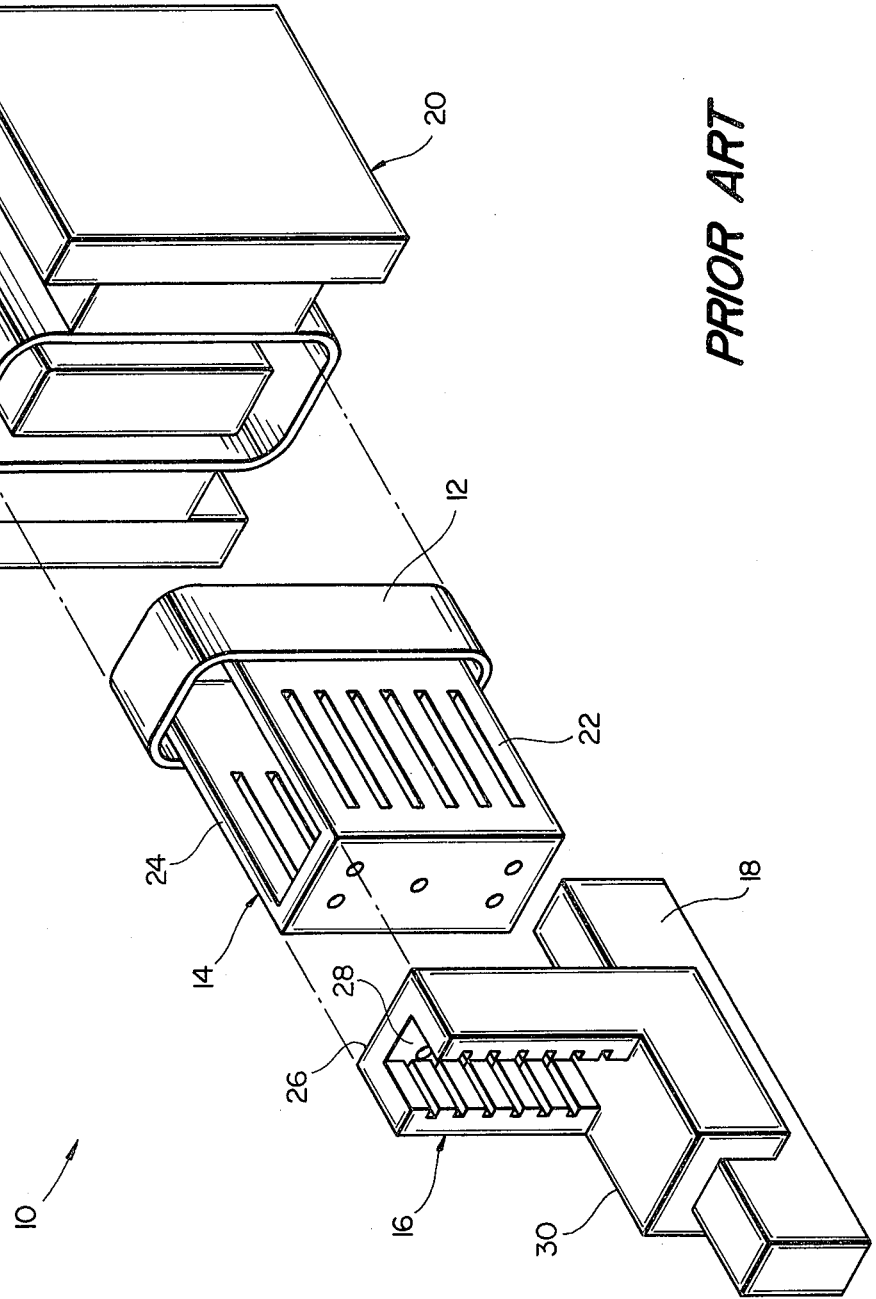

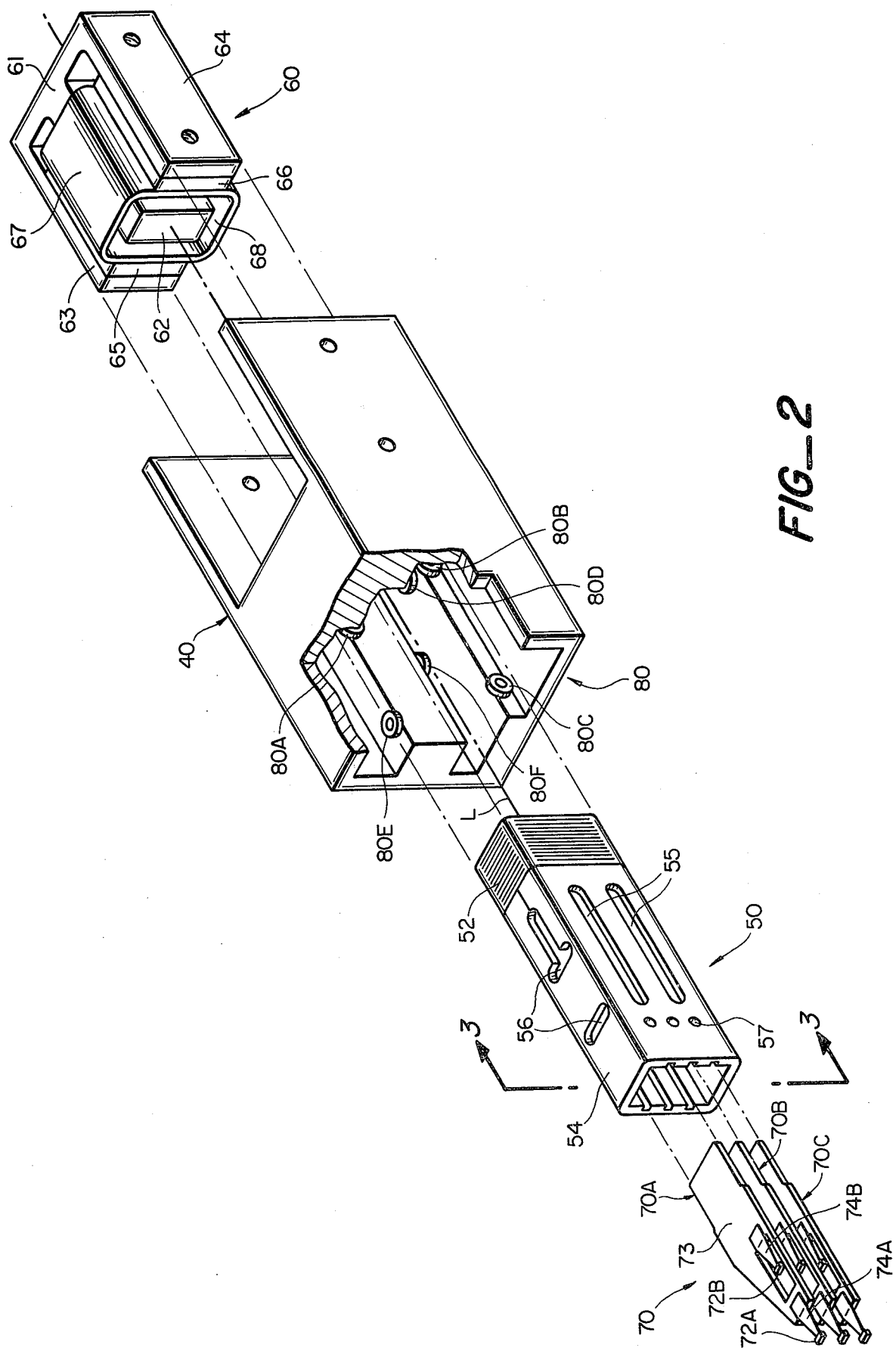

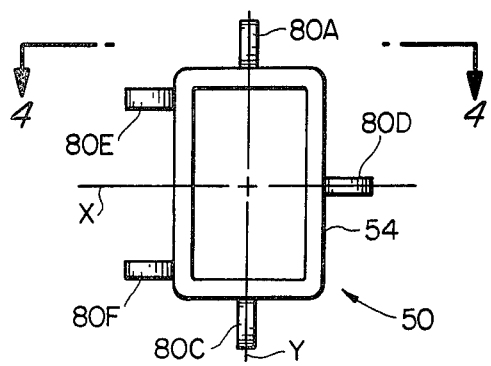
FIG_3
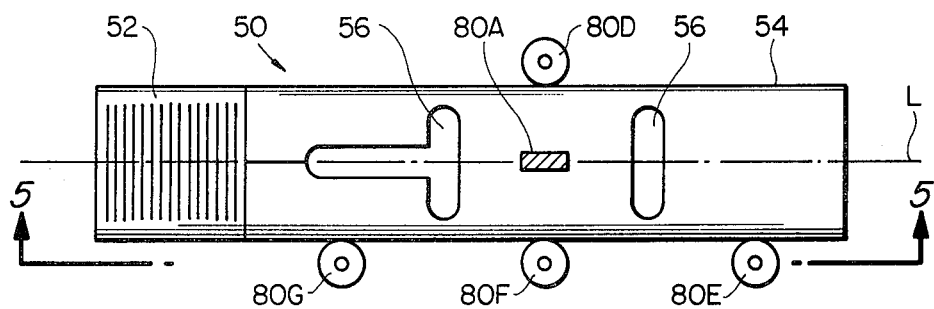
FIG_4
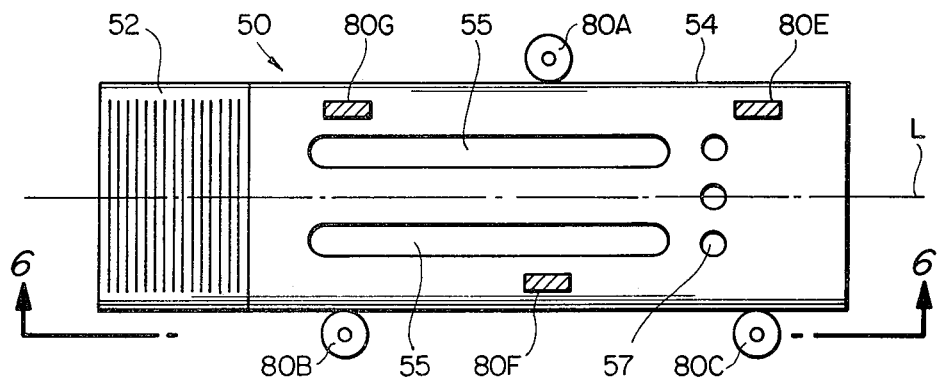
FIG_5
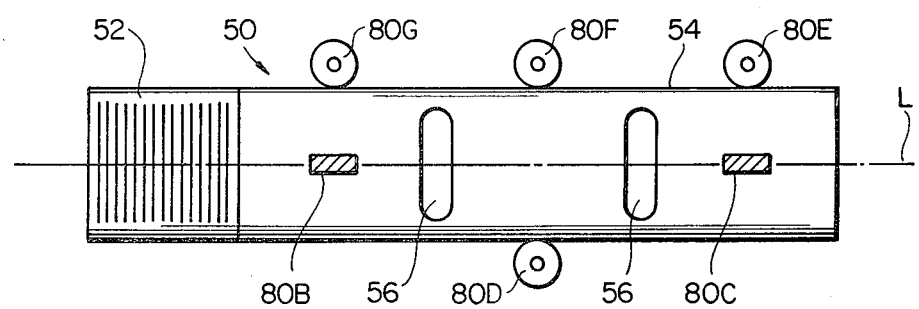
FIG_6

HIGH PERFORMANCE DISK DRIVE ACTUATOR

BACKGROUND OF THE INVENTION

1. Field of the Invention

This invention relates to electromagnetic linear actuators and more particularly to an improved actuator especially suited for positioning magnetic recording transducers over the surfaces of an array of spaced, rotating magnetic recording disks.

2. Description of Prior Art

Many electronic data processing systems make use of magnetic recording media such as disk drive storage systems for mass storage of data. The surfaces of the disks are coated with a suitable medium for the magnetic storage of data. Such data is usually stored in binary form in a series of narrow, concentric tracks located on the disk and spaced apart by about 0.0015 of an inch. The binary data is written upon or read from the tracks by magnetic transducers which are positioned over the desired tracks by an actuator.

In order to have rapid access to the data tracks and have high track densities on each disk, the actuator must be able to move the transducers quickly to the desired position and be able to maintain that position precisely. The electromagnetic linear actuator used in a disk drive system is well known to those skilled in the art. Linear actuator operation basically involves a direct current coil immersed in a strong magnetic field provided by permanent magnets. Current flowing in the coil by an electrical excitation applied thereto results in magnetic forces acting upon coil windings so that the coil moves linearly along the longitudinal axis of the coil in a direction dependent upon the polarity of the electrical excitation. The coil is mounted on a coil support structure which is in turn attached to one end of a transducer carriage. The magnetic transducers are attached to the other end of the transducer carriage opposite the end at which the coil is mounted and attached so that the transducers extend over the surfaces of the spinning disks.

A prior art actuator relevant to the present invention is shown in FIG. 1 of the drawings appended hereto. Actuator 10 of the prior art shown in an exploded perspective view comprises coil 12, coil support structure 14, transducer carriage 16, linear rail 18, and magnetic means 20. Coil 12 has a rectangular cross section and is bonded to coil support structure 14 which has parallel side walls 22 and 24. Coil support structure 14 is fastened to side 26 of transducer carriage 16 opposite side 28 which is adapted to support one more magnetic transducers (not shown). The rectangular cross section of coil 12 essentially matches the rectangular cross section of side 26 of transducer carriage 16. The features of matching cross sections and parallel side walls allow the magnetic forces, acting thereon for moving coil 12, to be transmitted to transducer carriage 16 as tension or compression forces without generating inherent shearing or bending forces. It is desirable to avoid shearing or bending forces because they tend to generate vibrations in the actuator which may adversely affect actuator performance. The illustrated actuator of the prior art has the advantage of having a coil support structure which is less massive then other actuators having coil support structures reinforced to resist adverse shearing or bending forces. A less massive actuator is desirable because of the reduction in power consumption and attendant advantages therefrom.

Transducer carriage 16 is an essentially L-shaped element having support means (not shown) mounted in leg 30 and engaging linear rail 18. As is the usual practice, coil 12 and coil support structure 14 are attached to transducer carriage 16 so that the center of forces acting on the coil will be in line with the center of gravity of a combined assembly comprising coil 12, coil support structure 14, transducer carriage 16 having support means, and magnetic transducers (not shown). Such construction eliminates any inherent roll or yaw moments acting on the combined assembly with respect to the support means. However, since the combined assembly rides upon rail 18 and coil 12 is disposed above the rail, an inherent pitching moment exists on the combined assembly with respect to the support means because the center of forces is directed at a point on the combined assembly above the support means. These pitching moments produce undesirable vibrations in the combined assembly as the magnetic transducers are moved to various positions in rapid succession and may cause the actuator to "hunt"; that is, the actuator will move the transducers back and forth repeatedly in an unacceptable range about a desired track. Hunting therefore limits the track density available on a recording disk and is undesirable.

SUMMARY OF THE INVENTION

Briefly described, the preferred embodiment of an actuator constructed in accordance with the principles of the present invention comprises a coil and cart assembly including a coil having a rectangular cross section and a cart having a cross section essentially matching that of the coil, the coil being mounted at one end of the cart and magnetic transducers mounted at the other end of the cart, an actuator housing used as a stationary base for supporting the various parts of the actuator, magnetic field generating means affixed to the actuator housing and having an air gap for receiving the coil, and support means comprising roller ball bearings affixed to the actuator housing and disposed around the center of gravity of a moving-mass assembly including the coil, the cart, and the magnetic transducers. The cart is tubular in construction with parallel side walls and with parallel top and bottom walls, and has prepared surfaces for engaging the roller bearings. The actuator embodying the principles of the present invention eliminates the undesirable inherent pitching moments which occur in the illustrated actuator of the prior art because the support means are disposed around the center of gravity of the moving-mass assembly. The moving-mass assembly corresponds in function to the combined assembly of the previously described prior art actuator. Furthermore, with the elimination of the inherent pitching moments, the present invention can be constructed with less mass than the illustrated prior art actuator and therefore has the additional advantage of consuming less power to achieve comparable performance. As in the case of prior art actuators, the arrangement of the present invention has no inherent roll or yaw moments acting on the moving-mass assembly with respect to the support means. Moreover, the present invention retains the features of the illustrated prior art actuator which eliminate inherent shearing and bending moments; that is, the cart has the features of a rectangular cross section and parallel side walls, and the coil has the feature of a rectangular cross section essentially matching that of the cart at which the coil is mounted.

DESCRIPTION OF THE DRAWINGS

FIG. 1 is an exploded perspective view illustrating an actuator of the prior art.

FIG. 2 is an exploded perspective drawing illustrating an actuator embodying the principles of the present invention.

FIG. 3 is an end view of a coil and cart assembly taken along section 2—2 of FIG. 2 and showing roller ball bearings separated from the actuator housing as they engage and support the cart (not shown are the transducer/arm assemblies, the actuator housing, and the mounting means for affixing the bearings to the actuator housing).

FIG. 4 is a sectional top view of the coil and cart assembly taken along lines 4—4 of FIG. 3.

FIG. 5 is a sectional side view of the coil and cart assembly taken along lines 5—5 of FIG. 4.

FIG. 6 is a sectional bottom view of the coil and cart assembly taken along lines 6—6 of FIG. 5.

DETAILED DESCRIPTION OF THE PREFERRED EMBODIMENT

Referring to FIG. 2, an actuator embodying the principles of the present invention comprises an actuator housing 40, a coil and cart assembly 50, magnetic field generating means 60, transducer/arm assemblies 70, and support means 80 (partially shown). The support means are shown in greater detail in subsequent figures which will be discussed later in this description. Actuator housing 40 serves as a stationary base for mounting various parts of the actuator, for insuring proper alignment of coacting parts, and for attaching the actuator into the rest of a disk drive system (not shown). In the preferred embodiment, both magnetic means 60 and support means 80 including seven roller bearings are affixed to the actuator housing.

The coil and cart assembly 50 comprises a direct current coil 52 and a tubular cart 54. One end of cart 54 is adapted to support a plurality of conventional transducer/arm assemblies 70 in one above the other vertical alignment. Transducer/arm assemblies 70A-C each comprises magnetic transducers 72A and 72B supported by flexure springs 74A and 74B mounted onto a transducer arm 73. The actuator positions the magnetic transducers over data tracks on the surfaces of spinning recording disks (not shown). Cart 54 is preferably made of metal and has a substantially rectangular cross section taken in a plane normal to a longitudinal axis L of the cart. Since portions of cart 54 will be immersed in a strong magnetic field provided by magnetic means 60, the effects of eddy currents induced by the rapid movements of the metal cart within the magnetic field may be reduced by forming slots 55 and 56 in cart 54. Slots 55 and 56 and holes 57 also help to reduce weight and are placed on four sides of the cart and sized so as not to adversely affect the longitudinal tensile strength of the cart. The width of cart 54 should preferably be only that necessary to support firmly the transducer/arm assemblies 70. The height of cart 54 depends upon the number of transducer/arm assemblies 70 desired to be used in a disk drive system. A conventional direct current coil 52 is mounted at the other end of cart 54 opposite the end adapted to support transducer/arm assemblies 70. Coil 52 has a cross section similar to the cross section of cart 54 and is mounted so that the center of gravity of the coil and the center of gravity of the cart are along a line colinear with longitudinal axis L of the cart.

As shown in FIG. 2 magnetic means 60 comprises E-shaped section 61 made of magnetically permeable material fashioned into the shape of an E with center leg of the E forming center pole 62. Center pole 62 preferably has a rectangular cross section and is encircled by coil 52 without being contacted by it. The outer legs of the E form outer poles 63 and 64. Permanent magnets 65 and 66 are mounted on the inner surfaces of outer poles 63 and 64 facing center pole 62. A shorted turn 67 is disposed between center pole 62 and two permanent magnets 65 and 66. Shorted turn 67 is bonded to permanent magnets 65 and 66 and encloses center pole 62 with a length equal to the length of permanent magnets 65 and 66, and defines an air gap 68 between center pole 62 and the inner surfaces of shorted turn 67. E-section 61 is preferably made of iron and constructed as one piece, permanent magnets 64 and 65 are powerful samarium cobalt magnets fashioned in a brick shape, and shorted turn 67 is made of copper.

Coil 52 on cart 54 is supported by support means 80 to fit loosely within air gap 68. Magnetic lines of flux generated by permanent magnets 65 and 66 pass through shorted turn 67, air gap 68 and coil 52 normal to the windings thereof, enter center pole 62, and return to the permanent magnets via outer poles 63 and 64 of E-section 61. An electrical excitation applied to coil 52 will result in the coil moving along longitudinal axis L of cart 54 in a direction dependent upon the polarity of the electrical excitation.

Support means 80 is disposed around the center of gravity of a moving-mass assembly comprising coil and cart assembly 50 and transducer/arm assemblies 70. The support means is arranged such that coil and cart assembly 50 is supported to inhibit roll, pitch, and yaw moments acting on the cart with respect to the support means. In the preferred embodiment, support means 80 includes seven roller ball bearings affixed to actuator housing 40 and engaging prepared surfaces of cart 54. FIG. 3 is an end view of coil and cart assembly 50 taken along lines 3—3 of FIG. 2 and illustrates the rectangular cross section of cart and coil assembly 50 and shows the relative positions of five roller bearings 80A and 80C–F of support means 80. The roller bearings are shown separated from the actuator housing.

FIG. 4 is a top view of coil and cart assembly 50 taken along section lines 4—4 of FIG. 3. Five roller bearings 80A and 80D-G of support means 80 are shown separated from the actuator housing. FIG. 5 is a side view of coil and cart assembly 50 taken along section lines 5—5 of FIG. 4 and shows six roller bearings 80A-C and 80E-G of support means 80 separated from the actuator housing. FIG. 6 is a bottom view of cart and coil assembly 50 taken along section lines 6—6 of FIG. 5 and shows six roller bearings 80B and 80C-G of support means 80 separated from the actuator housing. FIGS. 4 through 6 show typical examples of the placement of slots 55 and 56 and holes 57 formed in the body of cart 54 to reduce eddy currents and weight. Moreover, single roller bearing 80A engages the top surface of cart 54, roller bearings 80B and 80C engage the bottom surface, roller bearing 80D engages one side of cart 54, and roller bearings 80E-G engage the other side of cart 54. Side roller bearings 80E and 80G and bottom roller bearings 80B and 80C are located such that a vertical plane containing the center of gravity of the moving-mass assembly and containing a cross section of the cart will remain in the area between side roller bearings 80E and 80G and bottom roller bearings 80B and 80C for any cart position required for the transducer/arm assemblies to access any recording track on the spinning recording disks. This arrangement minimizes any inherent pitch and yaw moments acting on the cart with respect to the top, bottom, and side bearings.

As shown in FIG. 3, top roller bearing 80A and bottom roller bearing 80C are located on a vertical plane containing centerline Y of cart 54. The other bottom roller bearing, bearing 80B, is mounted in tandem with roller bearing 80C and cannot be seen in FIG. 3. Side roller bearing 80D is located on horizontal centerline X of cart 54. Side roller bearings 80E and 80F are disposed at an equal distance above and below a horizontal plane which contains centerline X of cart 54 and which runs through side roller bearing 80D. Side roller bearing 80G shown in FIG. 5 is mounted in tandem with side roller bearing 80E along a line parallel to longitudinal axis L of cart 54. This arrangement of the bearings inhibits any inherent roll moments acting on cart 54 with respect to the side bearings.

While the invention has been particularly shown and described with reference to the preferred embodiment, it will be understood by those skilled in the art that various changes in form and detail may be made without departing from the spirit and scope of the invention as recited in the following claims.

Having thus described my invention, what is claimed is:

1. An electromagnetic linear actuator comprising: a coil and cart assembly including a cart having a longitudinal axis and adapted at one end to support an element which is to be positioned along an axis parallel to the longitudinal axis, and a direct current coil mounted at the other end of said cart opposite the end adapted to support the element to be positioned, said coil having a longitudinal axis coincident with the longitudinal axis of the cart and having a cross section in a plane normal to its longitudinal axis which essentially matches the cross section of the end of said cart at which said coil is mounted, and said coil being mounted on said cart so that the center of gravity of the coil and the center of gravity of the cart are each on a line coincident with the cart longitudinal axis; an actuator housing including magnetic means having an air gap for receiving said coil and for passing magnetic flux through said coil normal to the surface of the windings thereof, whereby an electrical excitation in said coil results in movement of said coil and cart assembly along the cart longitudinal axis in a direction dependent upon the polarity of the electrical excitation; and support means affixed to the actuator housing, said support means engaging the the surface of said cart and being symmetrically disposed around the center of gravity of a moving-mass assembly comprising the coil and cart assembly and the element to be positioned when affixed to the coil and cart assembly such that said coil is suspended in the air gap of said magnetic means and said coil and cart assembly is supported to allow lineal movement thereof in either direction along the cart longitudinal axis and inhibit roll, pitch, and yaw movements of the coil and cart assembly.

2. The actuator of claim 1 wherein said cart is tubular and has a substantially rectangular cross section taken in a plane normal to the cart longitudinal axis.

3. The actuator of claim 2 wherein said cart is made of electrically conductive material and the body of said cart has holes and slots to reduce eddy currents and weight.

4. The actuator of claim 3 wherein said support means includes ball bearing rollers engaging prepared surfaces of said cart.

5. The actuator of claim 1 wherein said cart is made of electrically conductive material and the body of said cart has holes and slots to reduce eddy currents and weight.

6. The actuator of claim 1 wherein said support means includes ball bearing rollers engaging prepared surfaces of said cart.

* * * * *